United States Patent [19]

Gerenser et al.

[11] 4,400,447
[45] Aug. 23, 1983

[54] COMBINED CURRENT COLLECTOR AND ELECTRODE SEPARATOR

[75] Inventors: Robert J. Gerenser, Milpitas; Ernest L. Littauer, Los Altos Hills, both of Calif.

[73] Assignee: The Continental Group, Inc., Arlington, Va.

[21] Appl. No.: 270,114

[22] Filed: Jun. 3, 1981

[51] Int. Cl.³ .................... H01M 4/00; H01M 2/14; H01M 2/16; H01M 2/18
[52] U.S. Cl. .................................. 429/27; 429/142; 429/143; 429/144; 429/146; 429/129; 429/247
[58] Field of Search ................. 429/142–143, 429/144, 145, 129, 122, 67–69, 72, 81, 146, 247, 27

[56] References Cited

U.S. PATENT DOCUMENTS

| | | | |
|---|---|---|---|
| 2,478,632 | 8/1949 | Lockwood et al. | 429/129 |
| 3,129,118 | 4/1964 | Wilke et al. | 429/129 |
| 3,428,495 | 2/1969 | Deschamps | 429/142 |
| 3,496,018 | 2/1970 | Hamlen et al. | 429/145 |
| 3,536,535 | 10/1970 | Lippincott | 429/68 |
| 3,560,261 | 2/1971 | Stachurski et al. | 429/69 |
| 3,920,476 | 11/1975 | Black et al. | 429/68 |
| 4,052,541 | 10/1977 | von Krusenstierna | 429/68 |
| 4,169,917 | 10/1979 | Baker et al. | 429/72 |
| 4,283,470 | 8/1981 | Freeman et al. | 429/247 |

*Primary Examiner*—Donald L. Walton
*Assistant Examiner*—Stephen J. Kalafut
*Attorney, Agent, or Firm*—Charles E. Brown

[57] ABSTRACT

This relates to reactive metal cells wherein there is a cathode and a consumable anode. It is necessary to separate the cathode from the anode so that an electrolyte may constantly flow over the face of the anode opposing the cathode. It has been found that this separator may also beneficially function as a current collector. The combined current collector and separator includes a peripheral supporting frame of which a portion may function as a bus-bar. A plurality of bars or ribs extend in parallel relation across the opening defined by the supporting frame and are electrically connected to the bus-bar portion. It is preferred that each bar or rib have a pointed or line edge which will engage and slightly bite into the associated anode to maintain the bar or rib in electrical contact with the anode. This abstract forms no part of the specification of this application and is not to be construed as limiting the claims of the application.

11 Claims, 6 Drawing Figures

U.S. Patent  Aug. 23, 1983  4,400,447
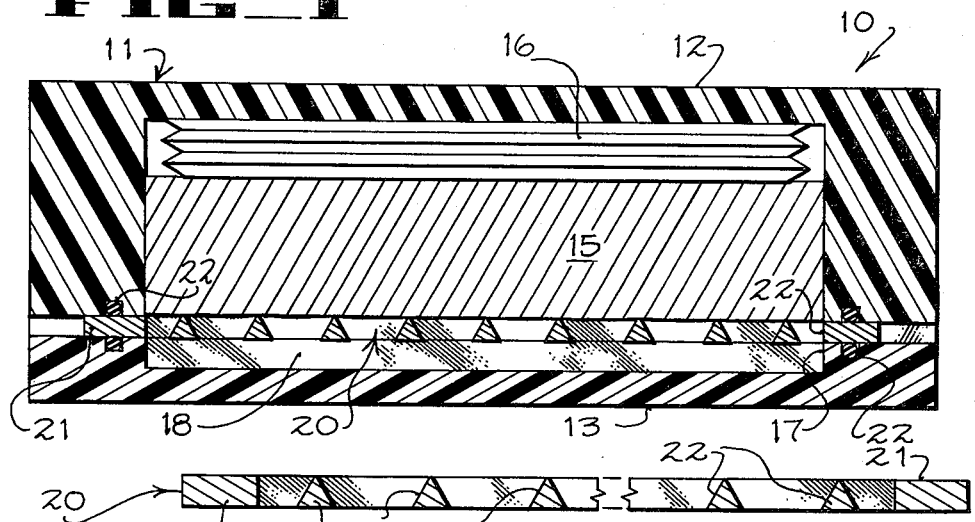
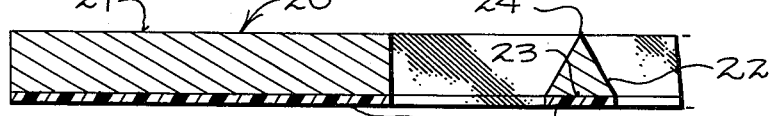
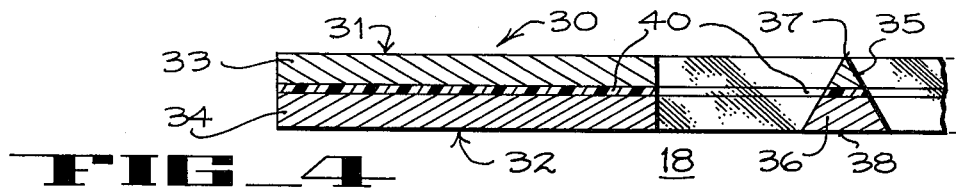
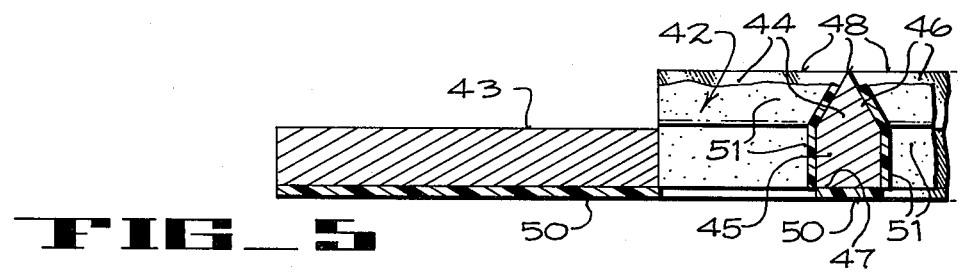
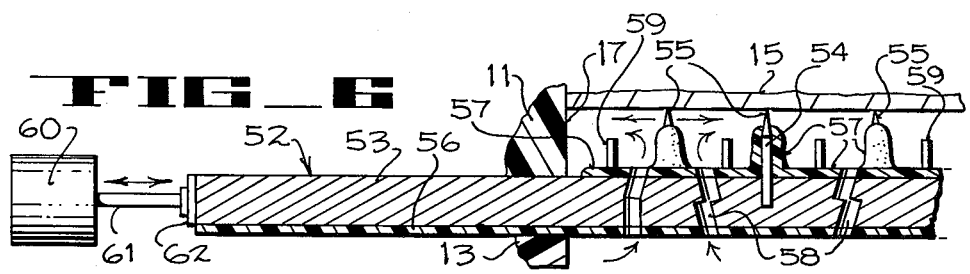

COMBINED CURRENT COLLECTOR AND ELECTRODE SEPARATOR

The U.S. Government has rights in this invention pursuant to Purchase Order No. 5513309 with The Continental Group, Inc. under Prime Contract No. W-7405-ENG-48 between The University of California and The U.S. Department of Energy.

This invention relates in general to new and useful improvements in reactive metal cells of the type including a cathode and a consumable anode. Most particularly, the invention relates to reactive metal cells of the type having an air cathode.

The invention particularly relates to a novel current collector/separator which allows current collection on the active side (electrolyte side) of a power cell having consumable anodes.

In power cells of the type having consumable anodes, preferably metal anodes, the anode is separated from the cathode by a separator which may also function as a current collector. In accordance with this invention, the current collector and electrode separator are configurated so as to permit the flow of an electrolyte across the face of the anode. It has been found in accordance with this invention that if the combined electrode separator and current collector includes a backing for contacts thereof, and the backing is in part a bus-bar, and if the follow space defined by the supporting frame has bars therein extending in the direction of electrolyte flow, the separator may have a dual function. Accordingly, this is the primary purpose of this invention.

It has been found that the combined electrode separator and current collector may beneficially be provided in several forms. In the simplest form, there is provided a suitable backing which is in the form of a flat base having projecting therefrom a plurality of contacts preferably in the form of needles. The base will be provided with electrolyte flow passages therethrough which will supply the electrolyte into the free areas between the needles in a turbulent state. In another form of the invention, the backing may be in the form of a peripheral supporting frame with there being contact forming bars extending between at least two opposite sides of the supporting frame and in electrical conducting relation with respect thereto.

It is also preferred that the contacts, whether they be in the form of needles or bars, have only those small portions thereof which are disposed immediately adjacent the anode free with the contacts being otherwise coated with electrical insulation so that only a minimal amount of the contacts will be exposed to the electrolyte.

In addition, in order to obtain a substantially uniform erosion of the anode, it is preferable that means be provided for shifting the current collector and electrode separator relative to the anode so that the areas of contact between the contacts and the anode be constantly shifted.

Another feature of the invention is to assure the turbulence of the electrolyte against the face of the anode, particularly when the anode is of a material such as lithium which forms a relatively hard oxide and which oxide must be constantly broken up to permit the required electro-chemical reaction over the entire surface of the anode.

In accordance with this invention, the bars are primarily triangular in cross section so as to have a relatively wide flat base for oppsoing the cathode and a pointed or line edge for engaging the anode in electrical contact therewith. Such a bar construction is simple in configuration and the current collector/separator may be readily formed by way of suitable machining operations.

Further, in accordance with this invention, it is to be understood that at least the face of the separator which engages the anode and functions as a current collector be electrically insulated relative to the cathode. Accordingly, there is associated with the combined current collector/separator an insulating layer. When the current collector/separator functions solely as a current collector contact relative to the anode, the insulating layer may be across the base of the ribs. On the other hand, it is feasible that the combined current collector/separator be a current collector associated with both the anode and the cathode. In such event, the current collector/separator may be of a two-layer construction with a suitable insulating layer therebetween. In such event, the supporting frame may also be of a two-layer construction so as to define two separate bus-bars insulated relative to one another.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic sectional view taken through a reactive metal cell formed in accordance with this invention illustrating broadly the position of a typical combined current collector/separator formed in accordance with this invention.

FIG. 2 is an enlarged sectional view of the combined current collector/separator with an intermediate portion thereof broken away.

FIG. 3 is a still further enlarged view of an edge portion only of the combined current collector/separator of FIG. 2.

FIG. 4 is an enlarged fragmentary sectional view similar to FIG. 3, and shows a modified form of combined current collector/separator.

FIG. 5 is another enlarged fragmentary sectional view showing still another form of the combined current collector/separator.

FIG. 6 is still another enlarged fragmentary sectional view showing a still further form of combined current collector/separator.

Referring now to the drawings in detail, it will be seen that there is illustrated a reactive metal cell formed in accordance with this invention and generally identified by the numeral 10. The cell 10, which is only schematically illustrated, includes a housing 11 formed in two parts 12, 13 and of a hollow construction. The housing 11 is formed of a suitable insulating material and is illustrated as being formed of a suitable plastic material.

The housing part 12 is provided with an internal recess 14 in which there is seated a consumable metal anode 15 which is preferably aluminum. The anode 15 is preferably in relatively thick sheet form and has side edges which will be sealed relative to the housing part 12 against the flow of electrolyte thereabout in a manner not shown and not forming part of this invention. Disposed within the recess 14 rearwardly of the anode 15 is an expansible member 16 which applies a constant pressure on the anode 15 urging the same out of the recess 14. The device 16 may be of any suitable type as far as this invention is concerned, although it has been illustrated generally in the form of bellows.

The housing part 13 is also formed with a recess 17 which is aligned with the recess 14. A suitable cathode 18, which is only schematically illustrated, is seated within the recess 17. The cathode 18, in accordance with the more specific aspects of the invention, is preferably in the form of an air cathode, although the invention is not so limited.

The anode 15 is separated from the cathode 18 by a combined current collector and separator 20 which is the subject of this invention. The combined current collector/separator 20 serves the dual function of electrically separating the anode 15 from the cathode 18 for the efficient flow of an electrolyte across the face of the anode while being in electrical contact with that face of the anode over which the electrolyte flows so as to collect the developed current.

In the illustrated embodiment of the combined current collector/separator 20, it has a peripheral supporting frame 21 which defines an outline generally corresponding to the outline of the recesses 14 and 17 and in alignment therewith. The supporting frame 21 is clamped between the parts 12 and 13 of the housing 11 and is sealed with respect thereto by way of suitable O-rings 22.

Referring now to FIG. 2, it will be seen that the combined current collector/separator 20, in addition to including the peripheral supporting frame 21, has a plurality of bars 22 extending in parallel relation across the opening defined by the frame 21. The bars 22 are preferably formed integrally with the supporting frame 21, but must be in electrical conducting engagement with at least one side edge of the supporting frame 21 so that the supporting frame 21 may, at least in part, function as a bus-bar.

Referring now to FIG. 3, it will be seen that each bar of rib 22 is triangular in cross section so as to have a flat base 23 and a pointed or line edge 24. The flat base 23 of each rib 22 opposes the cathode 18, while the pointed or line edge 24 engages and generally digs into the adjacent face of the anode 15 so as to make good electrical contact therewith. Thus, the bars 22 collect the developed current and transfer it to the peripheral supporting frame 21 so as to provide for the collection of current and the utilization of the peripheral frame 21 at least in part as a bus-bar.

It is to be understood that since the anode 15 is constantly urged against the pointed or line edges 24 of the bars 22, the edges of the bars 22 will slightly dig into the face of the anode and make good electrical contact therewith.

Electrolyte is directed across the face of the anode 15 generally parallel to the bars 22 with the spaces between adjacent bars defining electrolyte flow passages.

Since the combined current collector/separator 20 has electrical contact with the anode 15, it must be insulated relative to the cathode 18. Accordingly, there is an insulating layer 25 on that side of the combined current collector/separator 20 which opposes the cathode.

Referring now to FIG. 4, it will be seen that there is illustrated a modified form of combined current collector/separator identified by the numeral 30. While the combined current collector/separator 20 is of a single thickness with the insulating layer 25 on the cathode side thereof, the current collector/separator 30 is of a laminated construction so as to collect current from both the anode and the cathode.

The combined current collector/separator 30 includes a first layer 31 and a second layer 32. The layers 31, 32 include a peripheral supporting frame 33, 34, respectively. The supporting frame layer 33 has extending between two opposite sides thereof triangular bars or ribs 35, while the peripheral supporting frame 32 has extending across the opening defined thereby in alignment with the bars 35, bars 36 of a frustoconical configuration so that the combined configuration of each bar of bars 35, 36 is triangular. The bar 35 has a free pointed or line edge 37 while the bar 36 has an exposed base 38.

The combined current collector/separator 30 further includes an insulating layer 40 which separates the two parts 31, 32 in insulated relation, Thus, a portion of each of the peripheral supporting frames 33, 34 may function as a bus-bar, one associated with the ribs 35 and the other associated with the ribs 36, for separately collecting current from both the anode and the cathode.

In FIG. 5 there is illustrated still another form of combined current collector/separator 42 which includes a peripheral supporting frame 43 having disposed within the opening defined thereby and extending between two opposite sides thereof bars or ribs 44. Each bar or rib 44 includes a base portion 45 which is rectangular in cross section and which lies wholly within the general plane defined by the peripheral supporting frame 43. Each bar 44 also includes a projecting portion 46 which is generally triangular in cross section.

Once again, each bar 44 includes a flat base 47 for opposing the cathode and a pointed or line edge 48 for engaging and slightly penetrating the consumable anode.

Inasmuch as the peripheral supporting frame 43 functions as a bus-bar for collecting current only from the anode, there is provided an insulating layer 50 covering that face of the combined current collector/separator which opposes the cathode.

Although it has not been so illustrated, it is also feasible to form the combined current collector/separator of a laminated construction as shown broadly in FIG. 4.

At this time it is pointed out that the preferred slope angle of the bars or ribs is 60°, but other angles may suffice. It is also pointed out that a typical bar would have a base width on the order of 0.030 inch.

With particular reference to the combined current collector/separator of FIG. 5, it is to be noted that in addition to the electrical insulation 50 which extends across the flat base of each bar 44 for electrically separating each bar 44 from the cathode 18, there is a further layer of insulation 51 which extends up both sides of each bar 44 and substantially entirely encloses each bar 44, leaving only the extreme line edge or tip area 48 free of insulation and free for electrical conducting contact with the anode 15. By so insulating the bars 44 and like bars of the other combined current collector/separators, the exposed surface of the combined current collector/separators subject to contact with the electrolyte is held to a minimum and therefore hydrogen evolution from the electrolyte is held to a minimum.

Reference is now made to FIG. 6 wherein still another form of current collector/separator, generally identified by the numeral 52, is illustrated. The current collector/separator 52 is provided with a suitable backing in the form of a base plate 53 which is formed of a suitable electrical conducting material. The base or base plate 53 has embedded therein lower portions of a plurality of needles 54 having pointed upper ends 55 and forming contacts for engagement with the opposed face of the anode 15. In accordance with that set forth above relative to FIG. 5, the base has covering the undersurface thereof a layer of electrical insulating material 56 so as electrically to insulate the current collector/separator 52 from the cathode 18. A similar appropriate layer of insulating material 57 overlies that part of the base 53 which will normally be exposed to electrolyte, with the insulating material 57 also extending up the needles 54 and leaving only the extreme tip portions thereof exposed.

Referring once again to FIG. 1, it will be seen that the anode 15 is constantly urged against the pointed or line edge of the bars of the respective combined current collector/separator and thus is in electrical contact therewith. Electrolyte (not shown) will be flowed between the bars parallel thereto across the face of the andoe 15 which opposes the cathode 18 and in conjunction with the cathode 18 effects a reaction which will result in the production of electrical current which will be collected by the bars and transferred to the bus-bar portion of the peripheral support frame. No attempt has been made to illustrate the manner in which the electrolyte is introduced, collected or recirculated, nor has any attempt been made to illustrate the usual electrical connections of the reactive metal cell 10. It is to be understood, however, that the combined current collector/separator must not trap large quantities of the electrolyte and that the area wherein electrolyte is normally present in the active cell must be drainable at a rapid rate.

At this time it is pointed out that hydrogen evolution should be inhibited to the greatest extent possible. As set forth above, it is desired to maintain the exposed surface area of the current collector/separator at a minimum. Next, the surface contact area between the anode and the current collector/separator should be adequate to provide a low resistance connection between the anode and the current collector/separator.

The current collector/separator should be formed of a material with high hydrogen overvoltage, i.e. one which resists discharging of hydrogen from the electrolyte. At the same time, the material of the current collector/separator should be of such nature as to avoid plating out of undesirable films thereon during active use.

It has been found that suitable materials for the formation of the current collector/separator include lead, a hard lead alloy, and a lead amalgam which includes, in addition to the lead, silver and mercury.

It is also highly desirable with particular anode materials, reference here being made to lithium, that there be provided turbulence within the electrolyte so as to prevent the build-up and maintenance of an oxide layer on the face of the anode. The turbulence of the electrolyte can be effected in any desired manner. However, with the combined current collector/separator 52, the base 53 may have electrolyte passages 58 therethrough which would effect a turbulence within the electrolyte disposed between the base 53 and the anode 15 around the needles or contacts 54. That surface or face of the base 53 opposing the anode 15 may also be provided with suitable baffles 59 which extend between adjacent needles 54.

It is also desirable constantly to shift the area of contact between the bars or needles and the anode so that there may be uniform erosion of the anode over the entire surface of the active face thereof. To this end there has been illustrated a simple vibrator unit 60 having a drive member 61 which is coupled to an edge of the base 53 as at 62 in electrically insulated relation. It is to be understood that a similar vibrator may be coupled to the base 53 at right angles to the illustrated vibrator.

A like vibrator or other type of actuator capable of shifting the other illustrated and disclosed combined current collector/separators may be provided.

Although only several preferred forms of the combined current collector/separator have been specifically illustrated and described herein, it is to be understood that minor variations may be made in the combined current collector/separator without departing from the spirit and scope of the invention as defined by the appended claims.

We claim:

1. In a reactive metal cell of the type including a cathode and a consumable anode, a combined electrolyte side electrode current collector and electrode separator disposed between said cathode and said anode, the combined current collector and electrode separator comprising a backing in part forming a bus-bar, and a plurality of contacts projecting from one side of said backing in spaced relation and electrically coupled to said backing, said contacts being in electrical contact with said anode and defining between said backing and said anode open areas for electrolyte flow substantially fully over said anode face, said contacts being in the form of needles which with the exception of tips thereof are coated with an electrical insulation resistive to electrolyte wherein exposed surface areas of said needles are held to a minimum.

2. A reactive metal cell according to claim 1 wherein said combined current collector and electrode separator has a high hydrogen overvoltage.

3. A reactive metal cell according to claim 1 wherein said combined current collector and electrode separator has a high hydrogen overvoltage and is selectively formed of lead, lead alloy and an amalgam of silver with mercury.

4. In a reactive metal cell of the type including a cathode and a consumable anode, a combined electrolyte side electrode current collector and electrode separator disposed between said cathode and said anode, the combined current collector and electrode separator comprising a backing in part forming a bus-bar, and a plurality of contacts projecting from one side of said backing in spaced relation and electrically coupled to said backing, said contacts being in electrical contact with said anode and defining between said backing and said anode open areas for electrolyte flow substantially fully over said anode face, said backing being in the form of a peripheral frame, and said contacts being in the form of ribs exteding in spaced parallel relation between two opposite sides of said support frame, each of said ribs being of a cross section to define a pointed nose engaging a face of said anode in generally line contact and having a flat base for opposing said cathode, and said ribs defining open areas for electrolyte flow substantially fully over said anode face between said bars, each of said ribs being triangular in cross section, and there being an insulating layer on said flat base of each rib separating each rib from said cathode.

5. In a reactive metal cell of the type including a cathode and a consumable anode, a combined electrolyte side electrode current collector and electrode separator disposed between said cathode and said anode, the combined current collector and electrode separator comprising a backing in part forming a bus-bar, and a plurality of contacts projecting from one side of said backing in spaced relation and electrically coupled to said backing, said contacts being in electrical contact with said anode and defining between said backing and said anode open areas for electrolyte flow substantially fully over said anode face, said backing being in the form of a peripheral frame, and said contacts being in the form of ribs extending in spaced parallel relation between two opposite sides of said support frame, each of said ribs being of a cross section to define a pointed nose engaging a face of said anode in generally line contact and having a flat base for opposing said cathode, and said ribs defining open areas for electrolyte flow substantially fully over said anode face between said bars, each of said ribs being triangular in cross section, each rib being divided in a height direction into a tip portion and a base portion, and there being an insulation layer between said tip portion and said base portion.

6. A reactive metal cell according to claim 5 wherein said support frame is divided in the thickness direction into a separate bus-bar for said tip portions and for said base portions, and means insulating said bus-bars relative to one another.

7. A combined current collector and electrode separator for positioning between an anode and a cathode of a reactive metal cell, said combined current collector and electrode separator comprising a peripheral support frame, at least part of said support frame defining a bus-bar, a plurality of ribs extending between opposite sides of said support frame and electrically connected to said bus-bar, each of said ribs having a base for opposing a cathode and a line edge remote from said base for opposing an anode, and insulating means carried by each of said ribs for insulating each rib line edge relative to a cathode, said insulating means being in the form of an insulating layer applied to said rib bases and to a corresponding face of said peripheral support frame.

8. A combined current collector and electrode separator for positioning between an anode and a cathode of a reactive metal cell, said combined current collector and electrode separator comprising a peripheral support frame, at least part of said support frame defining a bus-bar, a plurality of ribs extending between opposite sides of said support frame and electrically connected to said bus-bar, each of said ribs having a base for opposing a cathode and a line edge remote from said base for opposing an anode, and insulating means carried by each of said ribs for insulating each rib line edge relative to a cathode, said ribs being divided along an intermediate common plate into base portions and point portions, and said insulating means being disposed between said base portions and said point portions.

9. The combined current collector and electrode separator of claim 8 wherein there are also two bus-bars, one bus-bar connected to said base portions and the other bus-bar connected to said point portions, and said insulating means extending between said bus-bars.

10. The combined current collector and electrode separator of claim 9 wherein said peripheral support frame is formed in two separate halves separated along said common plane, and said insulating means extends between said peripheral support frame halves.

11. A combined current collector and electrode separator for positioning between an anode and a cathode of a reactive metal cell, said combined current collector and electrode separator comprising a peripheral support frame, at least part of said support frame defining a bus-bar, a plurality of ribs extending between opposite sides of said support frame and electrically connected to said bus-bar, each of said ribs having a base for opposing a cathode and a line edge remote from said base for opposing an anode, and insulating means carried by each of said ribs for insulating each rib line edge relative to a cathode, and wherein each rib has a rectangular cross-sectional base portion and a triangular pointed portion, and peripheral support frame being coplanar with said rib base portions and said rib pointed portions projecting beyond the general plane of said rib base portions and said peripheral support frame.

* * * * *